United States Patent Office 3,523,425
Patented Aug. 11, 1970

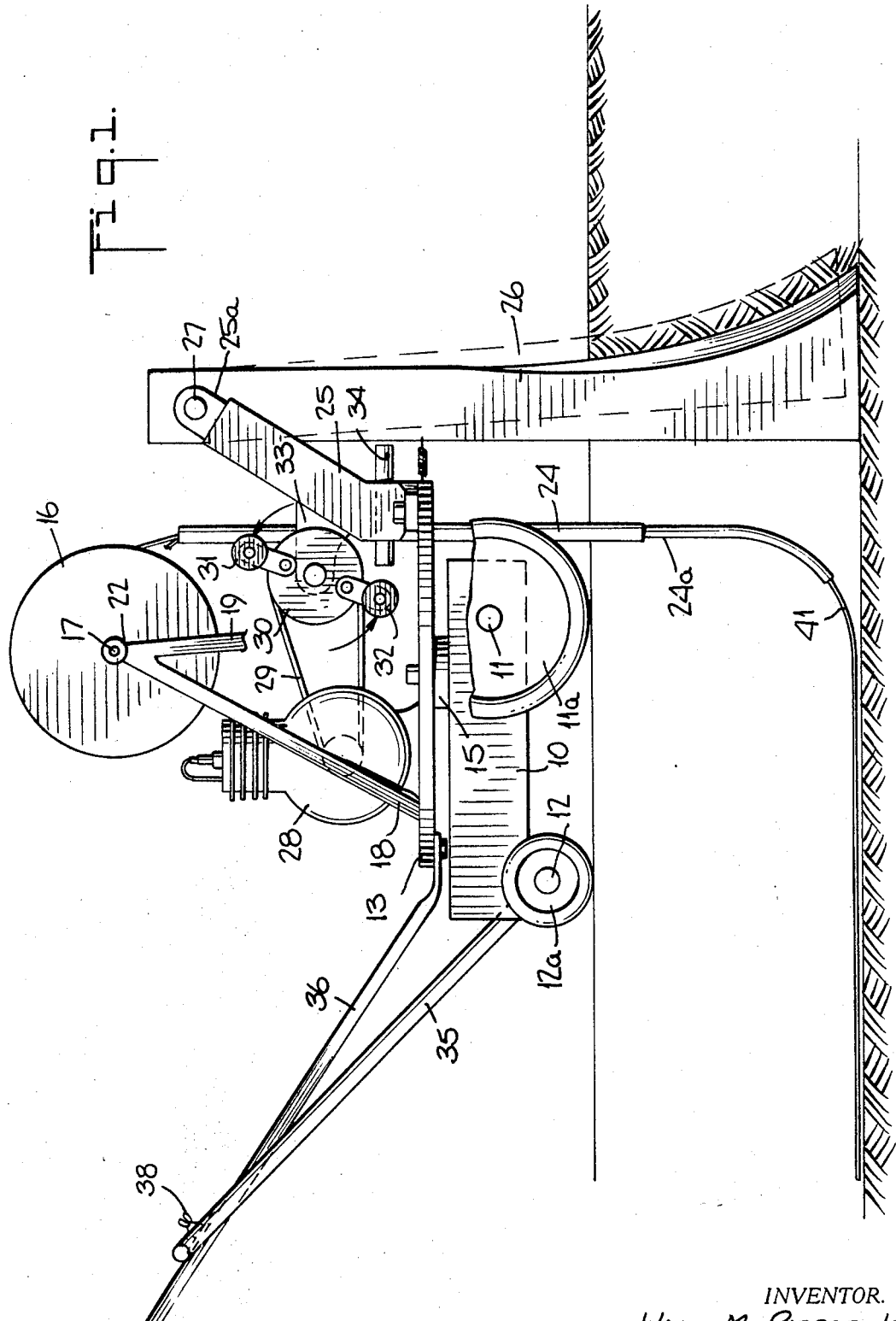

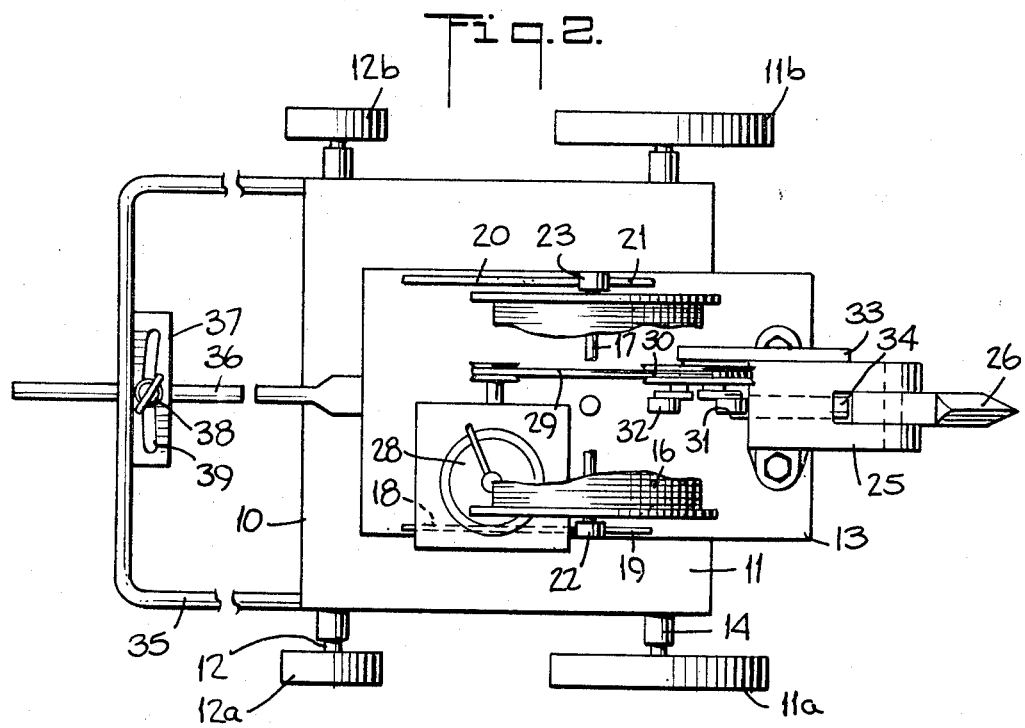
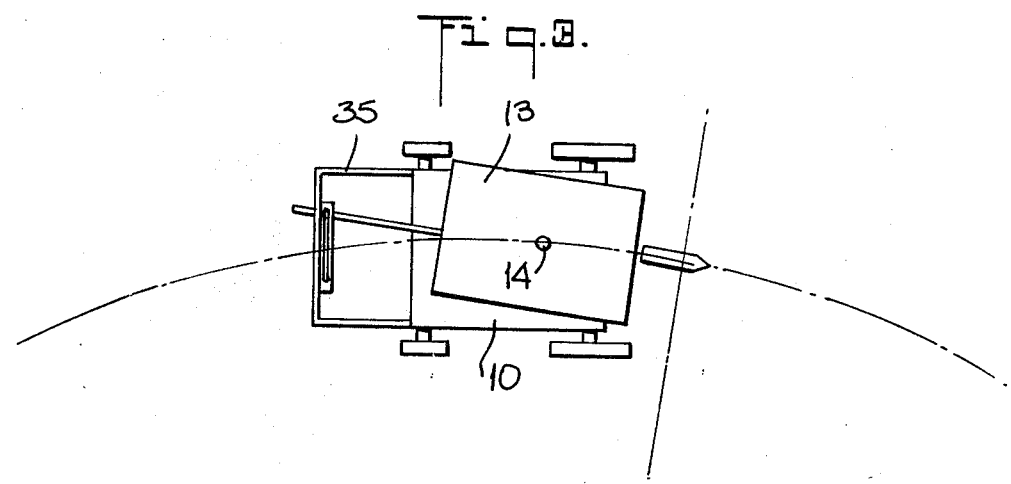

3,523,425
CABLE LAYING APPARATUS AND METHOD
Wayne M. Pierce, Jr., Milford, Conn., assignor to Hunt-Pierce Corporation, Milford, Conn., a corporation of Connecticut
Filed Feb. 12, 1968, Ser. No. 704,679
Int. Cl. F16l 1/00
U.S. Cl. 61—72.6      4 Claims

ABSTRACT OF THE DISCLOSURE

A cable laying apparatus is equipped with a share adapted to cut a groove. The share is activated by horizontally directed intermittent force.

BACKGROUND OF THE INVENTION

The laying of cable underground is an increasingly common practice as underground cable sustains damage much less frequently. It is, however, a very time consuming and expensive operation compared to overhead cables. In laying cable underground it is first necessary to dig a trench in which to lay the cable. The excavated earth is piled alongside the trench. The cable is then placed in the trench and the dirt replaced.

OBJECTS OF THE INVENTION

It is an object of the present invention to provide an improved method for laying cable. Another object is to provide a faster and more economical method for laying cable. A further object is to provide a method for laying cable which eliminates the necessity for excavating a trench. Still another object is to provide improved apparatus for laying cable. Yet another object is to provide apparatus which simultaneously cuts a groove and lays cable therein.

SUMMARY OF THE INVENTION

It has now been found that an improved method for laying cable underground comprises cutting a groove in the earth by intermittently applying a substantially horizontally directed force to a share and simultaneously laying cable in the groove. Apparatus for carrying out the method comprises a vehicle having a share adapted to cut a groove in the earth attached to the chassis, means for intermittently applying force to the share, and means attached to the vehicle for laying cable.

BRIEF DESCRIPTION OF THE DRAWING

FIG. 1 is a side elevation of the cable laying apparatus of the invention.
FIG. 2 is a plan view of the apparatus and FIG. 3 is a plan view of the apparatus showing the arrangement of the platform and chassis when laying cable along an arc.

DETAILED DESCRIPTION

The invention will now be described with reference to the drawings. As shown in FIG. 1, the apparatus comprises a chassis 10 supported on axles 11 and 12. Wheels 11a (and 11b shown in FIG. 2) are mounted on axle 11 and wheels 12a (and 12b shown in FIG. 2) are mounted on axle 12. Platform 13 is rotatably mounted on chassis 10 by means of pivot 14 and is supported above chassis 10 by collar 15. Supported above platform 13 is cable reel 16 mounted on axle 17. Reel 16 is supported by rod members 18, 19 (and 20 and 21 shown in FIG. 2). The rod members are attached at their lower ends to platform 13. Rod members 18 and 19 are attached at their upper ends to sleeve 22 mounted on axle 17. Rod members 20 and 21 are also attached at their upper ends to sleeve 23 mounted on axle 17 (shown in FIG. 2). Axle 17 is adapted to rotate within sleeves 22 and 23. A feed or drag tube 24 for guiding cable is attached to platform 13. Tube 22 is provided with telescoping means 24a at its lower end enabling it to be raised or lowered into the groove and to be fixed at the desired depth in the groove.

A U-shaped supporting arm 25 is attached to the front end of platform 13. A share 26 is mounted on a pivot 27 at the upper end of arm 25. Arm 25 is provided with telescoping upper section 25a enabling share 26 to be extended upwardly. Means (not shown) are provided for locking the arm 25a in its fully or partly extended positions. In this manner the depth of the groove is regulated. A gasoline engine 28 is mounted on platform 13. The engine is connected by transmission belt 29 to rotary impactor 30 having impact heads 31 and 32. Impactor 30 is supported by arm 33 which in turn is mounted on U-shaped arm 25. Rotation of impactor 30 causes heads 31 and 32 to intermittently engage ram 34 thereby forcing ram 34 against share 26. Share 26 is connected to platform 13 by spring 40.

Chassis 10 is provided with U-shaped handle 35, and platform 13 is provided with handle 36. Handle 36 engages slotted member 37 attached to the connecting member of handle 35. A pin 38 passes through slot 39 in member 37. The pin is mounted on handle 36 thereby restricting movement of handle 36 to the space of slot 39.

FIG. 3 shows the operation of the apparatus of the present invention in laying cable along an arc. By loosening pin 38, handle 36 is moved thereby pivoting platform 13 on pivot 14. The pivoting arrangement permits the share to always occupy a tangential position relative to the arc along which cable is to be laid. This facilitates forming the groove and laying the cable.

While the apparatus illustrated is adapted to be pushed manually, it will be obvious that the cable laying apparatus may be power driven as well. Thus, the cable laying apparatus of the invention may be incorporated into or mounted on a self-propelled vehicle.

Other structural arrangements may be employed to facilitate laying cable along an arc. It is not necessary that the platform be pivot mounted. The chassis can be provided with a single rear wheel or steering means can be provided to turn the axle.

Any suitable prime mover may be employed to drive the impact heads, i.e., a gasoline, diesel or steam engine or an electric motor. Preferably the drive means is provided with idling means, such as, for example, a toggle lever.

Various means may be employed to raise or lower the share and the feed tube. For example, the platform could be mounted on a vertical adjustment means e.g., a feed screw, or suitable means provided to adjust only the share and feed tube, e.g., arm 27 could have a telescoping projection at its upper end to raise and extend share 26 away from the chassis, and feed chute 24 could have a telescoping projection at its lower end.

While the location of the feed chute is not critical it is preferably located close to the share. In fact the feed chute could be located in a hollow inside the share or in a groove at the back of the share.

Non-rotary as well as rotary means may be used to drive the share intermittently. Pneumatic means, for example, may be used to drive the share.

EXAMPLE

In laying cable underground with the apparatus of the present invention, the share is raised and swung about its pivot 27 toward the rear of the chassis until the tip of the plow rests against the surface of the ground. Cable is fed through feed tube 24. Engine 28 is started. Transmission belt 29 rotates impactor 30. Each 360° rotation forces impact heads 31 and 32 against ram 34. The impact forces ram 34 against share 24 thereby forcing the share into the ground. When the share is approximately vertical the chassis is started forward. Each impact forces the share forward to the position shown by the dotted lines. After each impact, spring 40 and/or the forward motion of the apparatus restores share 24 to a substantially vertical position. The forward motion causes the share to cut further into the earth with each impact. The intermittent impacting cuts through roots and forces hard objects, such as rocks and stones aside. In this manner a groove is cut through the earth without excavating any dirt. Cable 41 is unwound from reel 20 as the chassis is advanced.

While the present invention has been described with reference to laying cable underground, it is equally useful for any other article which is to be layed underground. Examples are pipe, underground hose and conduits of various types.

It is to be understood that while the invention has been described in detail, variations and modifications may be made without departing from the invention as defined in the appended claims.

What I claim is:

1. An apparatus for making a groove for laying underground cable and the like including a vehicle means having a chassis for moving the apparatus, a platform rotatably mounted on said chassis, a spring-loaded share pivotally mounted on said platform with biasing means pivoting said share toward said platform, a ram movably mounted on said platform and engageable with said share, an impactor rotatably mounted on said platform, said impactor having a head thereon intermittently engageable with said ram for transmitting an impact force to said share to make a groove for laying underground cable and the like, and drive means mounted on said platform for rotating said impactor.

2. The apparatus of claim 1 wherein said share is pivotally mounted on an arm extending generally upwardly from the front end of said platform and wherein said ram extends from the front end of said platform and is engageable with said share at a point spaced from said pivotal mounting on said arm.

3. The apparatus of claim 2 wherein said impactor has a pair of rotatably mounted heads thereon intermittently engageable with said ram.

4. The apparatus of claim 3 having means mounted on said platform for laying a cable in the groove made by the apparatus, said means having a cable reel and a telescoping feed tube mounted on said platform, said telescoping feed tube extending from said reel to a point below said chassis.

References Cited

UNITED STATES PATENTS

| | | | |
|---|---|---|---|
| 794,930 | 7/1905 | Durkee | 173—99 |
| 2,499,620 | 3/1950 | Alderman | 172—40 |
| 3,326,009 | 6/1967 | Gagne | 61—72.6 |
| 3,348,383 | 10/1967 | Kelley | 61—72.6 |
| 3,367,716 | 2/1968 | Bodine | 299—14 |

JACOB SHAPIRO, Primary Examiner

U.S. Cl. X.R.

37—193; 172—40